US010482689B2

(12) United States Patent
McAfee et al.

(10) Patent No.: US 10,482,689 B2
(45) Date of Patent: Nov. 19, 2019

(54) CROWDSOURCED FAILURE MODE PREDICTION

(71) Applicant: Intel Corporation, Santa Clara, CA (US)

(72) Inventors: Eric Dwight McAfee, Portland, OR (US); Andrew Larson, Hillsboro, OR (US); Mark E. Sprenger, Tigard, OH (US); Mark Angus MacDonald, Beaverton, OR (US); Ralph V. Miele, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/572,334

(22) PCT Filed: Dec. 31, 2016

(86) PCT No.: PCT/US2016/069632
§ 371 (c)(1),
(2) Date: Nov. 7, 2017

(87) PCT Pub. No.: WO2018/125245
PCT Pub. Date: Jul. 5, 2018

(65) Prior Publication Data
US 2018/0276911 A1   Sep. 27, 2018

(51) Int. Cl.
*G07C 5/08* (2006.01)
*G01M 17/007* (2006.01)
*G07C 5/00* (2006.01)

(52) U.S. Cl.
CPC ............ *G07C 5/085* (2013.01); *G01M 17/007* (2013.01); *G07C 5/006* (2013.01); *G07C 5/008* (2013.01); *G07C 5/08* (2013.01); *G07C 5/0808* (2013.01)

(58) Field of Classification Search
None
See application file for complete search history.

(56) References Cited

U.S. PATENT DOCUMENTS

| 8,380,389 | B2 * | 2/2013 | Wright | G01M 17/04 342/42 |
| 8,630,768 | B2 * | 1/2014 | McClellan | G01S 5/0027 701/36 |

(Continued)

FOREIGN PATENT DOCUMENTS

WO   2018125245 A1   7/2018

OTHER PUBLICATIONS

International Search Report and Written Opinion in International Patent Application No. PCT/US2016/069632 dated Sep. 27, 2017, 14 pages.

*Primary Examiner* — Thomas G Black
*Assistant Examiner* — Demetra R Smith-Stewart
(74) *Attorney, Agent, or Firm* — Patent Capital Group

(57) ABSTRACT

In an example, there is disclosed a smart sensor for monitoring a vehicle, including: a sensor array comprising a mechanical input sensor; a network interface; a processor; and one or more logic elements providing a data engine to: collect an vibration input from the mechanical input sensor; and report the data from the mechanical input sensor to a data aggregator via the network interface. There is also disclosed a data aggregation server engine to aggregate and correlate inputs from the smart sensor.

25 Claims, 7 Drawing Sheets

(56) References Cited

U.S. PATENT DOCUMENTS

| | | | |
|---|---|---|---|
| 8,775,013 B1* | 7/2014 | Smailus | B64F 5/60 244/190 |
| 2009/0002148 A1 | 1/2009 | Horvitz | |
| 2011/0286302 A1* | 11/2011 | Welker | G01V 1/3826 367/16 |
| 2012/0296567 A1* | 11/2012 | Breed | G01C 21/26 701/468 |
| 2013/0233083 A1 | 9/2013 | Hofelsauer et al. | |
| 2014/0074345 A1* | 3/2014 | Gabay | G07C 5/008 701/31.4 |
| 2014/0309847 A1 | 10/2014 | Ricci | |
| 2015/0199854 A1 | 7/2015 | Olsen et al. | |
| 2015/0339570 A1* | 11/2015 | Scheffler | G06N 3/04 706/16 |
| 2016/0093119 A1 | 3/2016 | Ahn et al. | |
| 2016/0300252 A1* | 10/2016 | Frank | G06Q 30/0203 |
| 2017/0124781 A1* | 5/2017 | Douillard | G01S 15/931 |
| 2017/0176192 A1* | 6/2017 | Cardoso de Moura | G01C 21/3461 |
| 2017/0195953 A1* | 7/2017 | Amorim de Faria Cardote | H04L 67/12 |
| 2017/0238258 A1* | 8/2017 | Ramalho de Oliveira | H04W 52/0261 455/574 |
| 2017/0358151 A1* | 12/2017 | Koons | G07C 5/0808 |
| 2018/0047107 A1* | 2/2018 | Perl | G06N 5/02 |
| 2018/0126951 A1* | 5/2018 | Ricci | B60R 25/2018 |
| 2018/0141567 A1* | 5/2018 | Surnilla | B60W 50/0225 |

\* cited by examiner

CROWDSOURCED FAILURE MODE PREDICTION

This application is a national stage application under 35 U.S.C. § 371 of PCT International Application Serial No. PCT/US2016/069632, filed on Dec. 31, 2016 and entitled "CROWDSOURCED FAILURE MODE PREDICTION", which application is considered part of and is hereby incorporated by reference in its entirely in the disclosure of this application.

FIELD OF THE SPECIFICATION

This disclosure relates in general to the field of device automation, and more particularly, though not exclusively to, a system and method for crowdsourced failure mode prediction.

BACKGROUND

Self-driving cars are only one example of the many types of autonomous drones and vehicles that are quickly proliferating in the world. Some sources estimate that there will be millions of self-driving cars on the roadways of the United States by the year 2020.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
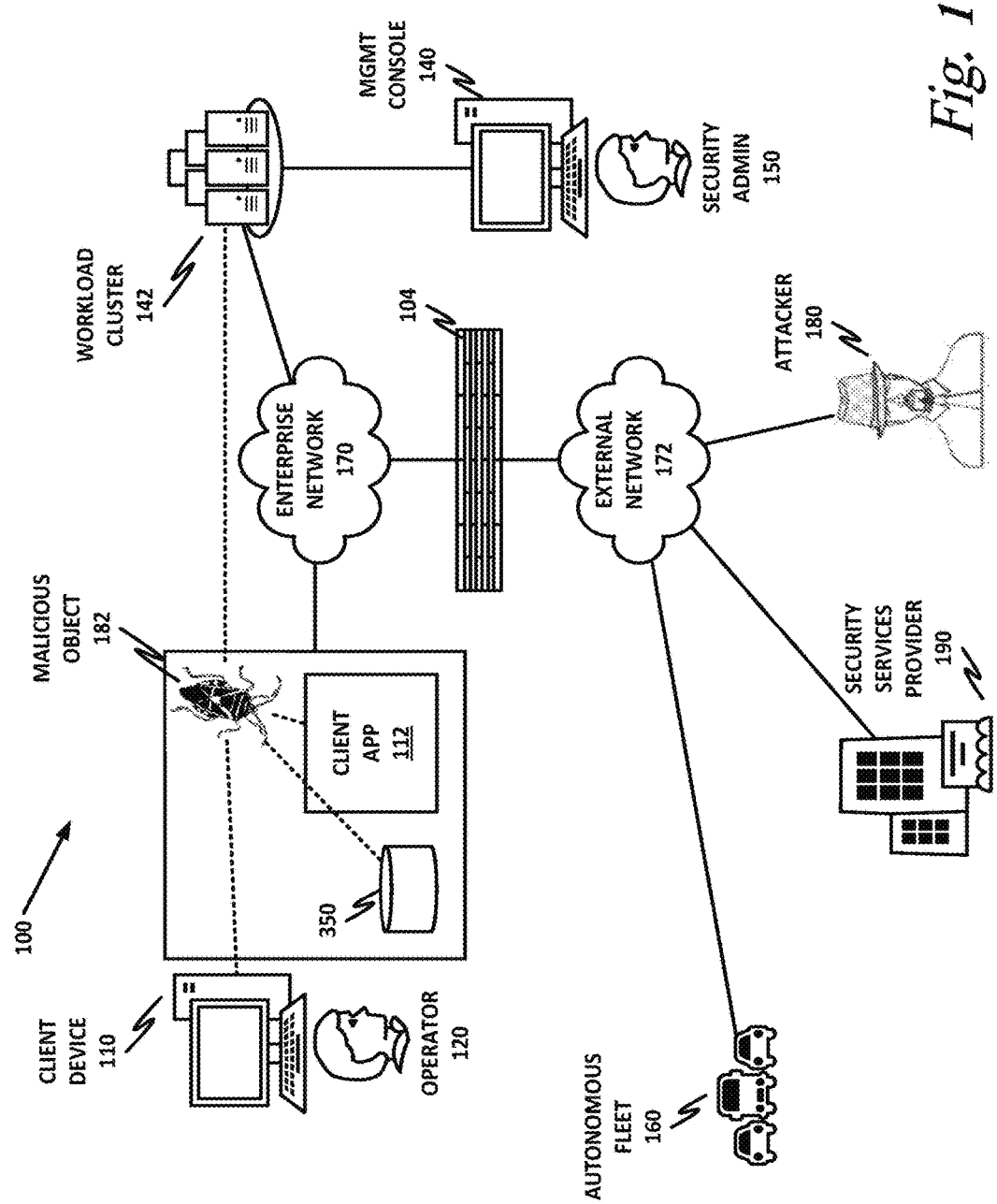
FIG. 1 is a block diagram of a drone monitoring network according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The advent and popularity of driverless cars pose new challenges. For one benefit of having a human driver in a car is that they can use their physical senses to identify when something is wrong with the vehicle. For example, a driver may feel the steering wheel shudder when braking at high speeds, or hear an unusual sound coming from under the hood while driving. These feelings and sounds, though not clearly defined as error modes, can serve as a warning that the vehicle needs service, diagnostics, or maintenance.

Driverless cars are, by definition, dependent on machine control, and while machines have many advantages over humans in terms of processing speed, data bandwidth, and signaling speed, they lack the uniquely human intuition that something is "off." Even a passenger in the vehicle might not notice the condition, because one of the primary features of driverless cars is that the human is freed from direct control and interaction—rather than focusing on driving a car, the human passenger can be reading a book, watching a move, or sleeping. Furthermore, the human user may be completely divested in interest from the vehicle itself (e.g., a driverless taxi), and thus may be more apathetic to the condition of the vehicle. Finally, some problems cannot be identified even by a perceptive human directly operating the car.

Thus, it is beneficial to provide machine-implemented diagnostic and prognostic techniques to help identify failure modes in autonomous vehicles of any type. This can be accomplished in one example by deploying one or more sensors on each vehicle in a fleet of vehicles. These sensors may be standalone devices that can be installed after-market and that are independent of the vehicle itself, or the sensors can be tightly coupled with the vehicle's electronic control unit, including the processor that makes control decisions, and inputs from the sensors that are used to provide navigational inputs.

Embodiments of the present specification provide a small universal module that can be placed on (or integrated into) a vehicle at various location (such as on a drivetrain component, wheel spindle, steering wheel, or elsewhere) to help predict failures before they happen by gathering metadata, via crowdsourcing, and identifying discrepancies between other, similar vehicles' acoustic and vibrational signatures. Data gathered can then be sent up to the cloud and used to identify any discrepancies. Machine learning techniques can then be applied to identify problems and propose solutions. In some examples, the solutions may be implemented automatically by the cloud server. In other examples, an operator (e.g., a human operator, or a computer expert system) and determine which actions to take.

This also provides a mechanism to capture potentially dangerous maintenance problems outside of the preventative maintenance schedule. This is especially relevant in autonomous vehicles where there is a minimal focus on subtle changes of operating condition.

The current process for car maintenance and repair timing is inefficient and will only becoming more challenging with the prevalence of driverless vehicles. Also, it is difficult to detect unusual or unknown problems that can arise. The basic principle of this specification is that many of these unknown failures can be identified by comparing a vehicle's acoustic, vibrational, or other mechanical or electrical signatures against other similar vehicles by crowdsourcing.

This data can come from placing modules that have sensors at nearly any stationary location in or on the vehicle. As the database of mechanical and electrical inputs grows and solutions are linked with specific signatures, this feedback system becomes more efficient.

The universal modules can be placed manually (post-production) at various locations on a vehicle to gather mechanical or electrical data (such as acoustic or vibrational data) and send those data up to a cloud database to identify discrepancies and determine the source and solution, even for unexpected problems or failures. The modules may also be incorporated into the vehicle by the auto manufacturers to allow the manufacturers to claim increased vehicle service and reliability features that can early detect failure modes and provide vehicle actuarial data in a feedback loop.

Examples of the smart sensor of this specification may include, by way of nonlimiting example:
- a. Sensors (such as a 3-axis accelerometer and mic array)
- b. Attachment mechanism (magnets, hooks, adhesive, screws, hardware, mounts, or other mechanical coupling means)
- c. A communication protocol (to upload the gathered data to the cloud for analysis)
- d. A power supply (such as a 12V rechargeable provided by the car or a coil cell battery)
- e. Compute module (such as Intel® Curie™, which includes Bluetooth, an accelerometer, and a gyroscope)
- f. In some cases, a connection directly to the vehicle's electronic control units (ECU) in order to combine information with drive data already being collected in newer vehicles.

The local sensors, combined with crowdsourced data from the cloud, may enable:
- a. Local sensor data that may be matched to known failure signatures of all available sensor inputs, which may be compared to failure signatures derived from crowdsourced data (initially from maintenance records of fleet vehicles)
- b. Comparison of data from known car make/models and their maintenance history
- c. Nuances of each vehicle may be tracked and leveraged through machine learning (Example: Some vehicles need brakes resurfacing more frequently than recommended by manufacturer, for example due to common but slight manufacturing imperfections)

Current vehicles include sensors located at crucial locations where known failures are expected (oxygen sensors for catalytic converter, pressure sensors for tires, level sensors for liquids, and so forth.). Heavy machinery and industrial applications also use sensors to monitor specific parts for known failures. In addition, autonomous vehicles may provide a suite of sensors used for navigation and direction. In some cases, the smart sensor interfaces with the autonomous vehicle and shares data with some or all of these sensors to help enhance its function.

The teachings of this specification may be applied to many sectors that employ fleets of autonomous vehicles. For example:
- a. Driverless Cars/Trucks/Taxis: Driverless vehicles have a difficult time detecting tactile/audible indicators. By placing this universal smart sensor at various locations on the vehicle, and sending up acoustic and vibrational data to the cloud for analysis, unusual discrepancies can be identified. A discrepancy indicates that something is different than other comparable vehicles that are collecting similar data, and the vehicle can be brought in for maintenance. The result/solution can then be uploaded to the database. Note: Discrepancies can identify not only wear and failures, but also outliers that are performing better for some reason.
- b. User/Mechanic Application: A user-specific application can be used in conjunction with the concept. With data from the universal smart sensor, users and mechanics can quickly identify the problem with a vehicle. A mechanic may deploy sensors into a customer's vehicle to diagnose the problem. After the repair, data can again be gathered and then be compared to the data that were gathered before the repair to assure the customer that a problem was fixed. The mechanic then could upload the repair to the universal database.
- c. Key Learning: An application for users and mechanics that takes the acoustic/vibrational signatures and compares it to other signatures to determine the source of possible discrepancies may improve the efficiency and transparency of vehicle maintenance/repairs.
- d. Key Learning: Driverless vehicle safety may be positively impacted by the knowledge of pending and/or existing mechanical failures. For example, one of the reasons that pilots are still required for commercial aircraft (which have been primarily auto-piloted for years) is because of their ability to react and debug the aircraft when a failure occurs. If the probability of a failure can be reduced and reported automatically, the hurdle of overcoming in-service failures with a software solution is less difficult to achieve.
- e. Long-Haul Trucking: The freight industry spends a significant amount of capital on travelling efficiencies (for example, "TrailerTail" flaps on the rear of a semi-trailer, which improve efficiency by about 5.5%). The future of long-haul trucking is likely in autonomous vehicles. The smart sensor of the present specification gives operators of truck fleets greater insight into maintenance timing, and improves the identification of preventable failures (especially ones that are not already expected or monitored).

In some examples, the universal smart sensor of the present specification may be or comprise a commercial, off-the-shelf (COTS) platform, such as Intel® Curie.

Another advantage is the ability of this system to identify when discrepancies improve the performance of the vehicle (which then can help identify design changes that can be implemented in future models). The data may also be used to select between competing models: If Make A, Model X experiences fewer anomalies than Make B, Model Y, future procurements may favor Make A, Model X.

In one operational example, an array of smart sensors is deployed on fleet of autonomous vehicles. Over time, vibrational and acoustic profiles are built for various subsystems of each vehicle (e.g., front axle, rear axle, brakes, engine, serpentine belt, air conditioner).

Over time, vehicle n's vibration data show an anomaly compared to its peers (e.g., vehicle n's vibration profile deviates substantially from its peer vehicles). Vehicle n is recalled and inspected by a service professional. A missing lug nut is identified and replaced. This action is uploaded to the cloud, and an association is made between that vibration profile and a missing lug nut. Vehicle n's vibration data are now consistent with its peers again. Over time, if other vehicles experience a similar vibration signature in connection with a missing lug nut, then the association between the vibration signature and the missing lug nut is strengthened, until encountering that particular vibration signature can be correlated with a missing lug nut, with a high degree of confidence.

Furthermore, if it is found that vehicles of this make and model consistently begin to experience the vibration signature at between 70,000 and 100,000 miles, then an actuarial statistic may also be recorded: the original lug nuts are reliable for 70,000 miles, and up to 100,000 miles. Thus, a suggested maintenance schedule may be created to replace or inspect the lug nuts at around 70,000 miles, and not later than 100,000 miles. Vehicles that report this vibration signature may also be brought in for service on the lug nuts, regardless of their mileage. Data about the intensity and danger of the vibration may also be used to craft a custom maintenance demand. If the vibration is intense and likely to be a danger or cause damage, the vehicle may be pulled and serviced immediately. If the vibration signature is minor, then the vehicle may be scheduled to receive service within, for example, not more than 5,000 operational miles.

Similar methods may be used to detect an acoustic signature for a failing serpentine belt, an acoustic and mechanical (vibration) signature for tires out of balance, or an acoustic or mechanical signature for a warped axle. Note that with some level of abstraction (e.g., allowing for a similar acoustic pattern shifted in tone, or a similar mechanical pattern with different harmonics), signatures learned from one vehicle may be applied to different types of vehicles (e.g., the acoustic signature for a stressed serpentine belt on a one-ton truck may be similar to the signature for a small quarter-ton pickup, but the latter may be higher in tone).

In another example, a user of a non-autonomous vehicle deploys one or more of the universal smart sensors on his car. He notices that while driving at high speed, the car makes a "funny" sound. When the user takes his car in to the mechanic, he does not have to try to explain the sound to the mechanic. The mechanic may instead connect a data cable to the smart sensor, download the acoustic data, and compare it to a global database of similar signatures. Note that this embodiment can also enhance user privacy: rather than "phoning home" wirelessly with all of its data, the sensor in this case provides a hard-wired connection that the mechanic can access only with permission from the user.

In another example, the acoustic/vibration data can help identify the possible problem by comparing it to similar cars data that have similar information recorded and sent to the cloud. This can help the mechanic have a preliminary diagnosis before the vehicle is even brought in.

A system and method for crowdsourced failure modes will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of drone monitoring network 100 according to one or more examples of the present specification. In the example of FIG. 1, network 100 may be configured to provide services to a fleet of autonomous vehicles 160. Note that the term "fleet" is used here broadly to encompass a plurality of autonomous vehicles, whether or not they have a single purpose, whether or not they are of a single type, and whether or not they are owned by a single entity or enterprise. A characteristic of this fleet of autonomous vehicles 160 is that the vehicles share at least one common failure mode. Thus, monitoring network 100 is provided to collect data from an array of smart sensors deployed on the autonomous vehicles, and to use those data to predict failure modes. The autonomous vehicles in the fleet may each serve as both an input point, and an analysis target, though in other instances, dedicated analysis targets may be designated, with other devices serving solely as actuarial inputs.

The security of network 100 is also a non-trivial consideration. The presence of bad inputs on the network can serve to reduce or obviate the value of monitoring network 100. Bad inputs can be the result of unintentional data corruption, or the result of attacks by a dedicated attacker 190, whose intent is expressly to corrupt data and to frustrate the predictive capacity of network 100. Furthermore, just as important as protecting data integrity may be protecting against data loss or interception by unauthorized third parties. Thus, monitoring network 100 may include security mechanisms to help identify and block bad inputs. For example, workload cluster 142 may host one or more server functions that aggregate and analyze inputs from autonomous fleet 160. Smart sensors on the autonomous vehicles may include a trusted execution environment (TEE) that can encrypt and digitally sign sensor inputs before transmitting them to the server function. The server function may then verify the inputs, such as via direct anonymous attestation (DAA) or other security methods.

Within network 100, one or more operators 120 operate one or more client devices 110. Operators 120 may be human operators whose purpose is to monitor autonomous vehicles in fleet 160, and to schedule maintenance and/or repairs as necessary. Operator 120 could also be a machine, such as an expert system, that makes intelligent decisions based on inputs from smart sensors. Operator 120 may be responsible for tasks such as monitoring autonomous vehicles in fleet 160, scheduling maintenance and repairs, analyzing maintenance requests from a server function to determine whether a repair or maintenance is warranted, carrying out repair and maintenance operations, counterterrorism, and exfiltration.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows operators 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide operator 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Network 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Network 100 may communicate across enterprise boundary 104 with external network 172. Enterprise boundary 104 may represent a physical, logical, or other boundary. External network 172 may include, for example, websites, servers, network protocols, and other network-based services.

In this example, an attacker 180 operates against monitoring network 100, with nefarious or negligent purposes. For example, attacker 180 could be a negligent developer who designs bad inputs that could be harmful to network 100. Or attacker 180 could be a malicious actor whose intention is to disrupt network operations, corrupt inputs (possibly as an act of international or industrial espionage), cause problems for his own entertainment, or otherwise disrupt operations by inserting malicious objects 182 into network flows. Thus, it is a goal of operator 120 and security administrator 150 to carry out their functions on network 100 without interference from attacker 180.

Network 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign. Advantageously, a service such as McAfee® GTI™ may also be adapted to aggregate inputs from autonomous vehicles, and may in some cases employ similar algorithms to identify behavior that is outside of normal. Specifically, an object may be designated as "suspicious" if it behaves in an unexpected way on the network. Similarly, a smart sensor input may be designated at "suspicious" (e.g., indicative of a need for maintenance or repair) if it is different from the expected behavior as compared to other inputs from autonomous vehicles. Just as viruses and other malware may be reduced to "fingerprints" and "signatures" for comparison and detection, so sensor inputs can be reduced to fingerprints and signatures (e.g., by compression, hashing, or otherwise) to detect similarities in inputs. However, this is only one nonlimiting example. In other examples, a completely different database with suitable algorithms may be designed to carry out the methods of the present specification. Building a database allows for data to be fine-tuned and false positives to be weeded out over time.

Figure 2:
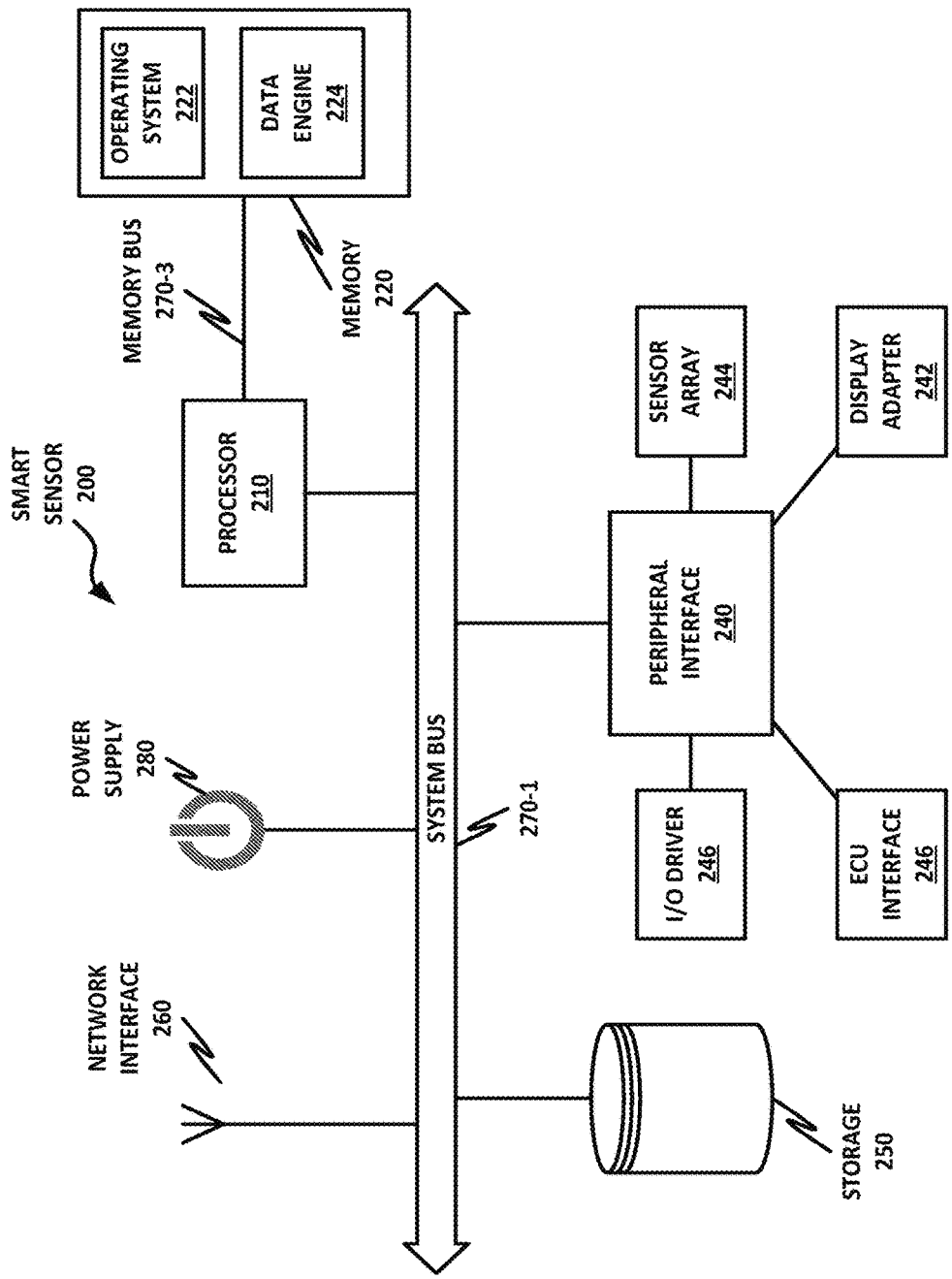
FIG. 2 is a block diagram of a smart sensor according to one or more examples of the present specification.

FIG. 2 is a block diagram of smart sensor 200 according to one or more examples of the present specification.

A power supply 280 is provided to power various system components. In various examples, power may be provided by interfacing to vehicle power systems on an autonomous vehicle. For example, in a self-driving car, power may be tapped from a power bus that connects to the vehicle 12V battery. Advantageously, this supply of power is substantially continuous so long as the autonomous vehicle itself is operational. In other examples, on-board power may be used, such as a battery (like a button battery), a solar cell, a fuel cell, a rechargeable battery, or any combination of these.

Smart sensor 200 includes a processor 210 connected to a memory 220, having stored therein executable instructions for providing an operating system 222 and at least software portions of a data engine 224. Other components of smart sensor 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In one example, processor 210 may be an Intel® Quark™ processor, such as those that run on Intel® "Curie™" low-power compute modules (and in fact, smart sensor 200 may be based on a Curie™ board or the Curie™ concept).

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Operating system 222 may be provided, though it is not necessary in all embodiments. For example, some embedded systems operate on "bare metal" for purposes of speed, efficiency, and resource preservation. However, in contemporary systems, it is common for even minimalist embedded systems to include some kind of operating system. Where it is provided, operating system 222 may include any appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices often use an embedded Linus or a dedicated embedded OS such as VxWorks. However, these examples are not intended to be limiting.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), redundant array of independent nodes (RAIN), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of data engine 224. In some examples, storage 250 may be a non-transitory computer-readable storage medium that includes hardware instructions or logic encoded as processor instructions or on an ASIC. Many other configurations are also possible, and are intended to be encompassed within the broad scope of this specification.

Network interface 260 may be provided to communicatively couple smart sensor 200 to a wired or wireless network. A "network," as used throughout this specification, may include any communicative platform or medium operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Data engine 224, in one example, is operable to carry out computer-implemented methods as described in this specification. Data engine 224 may include one or more tangible non-transitory computer-readable mediums having stored thereon executable instructions operable to instruct a processor to provide a data engine 224. As used throughout this specification, an "engine" includes any combination of one or more logic elements, of similar or dissimilar species, operable for and configured to perform one or more methods provided by the engine. Thus, data engine 224 may comprise one or more logic elements configured to provide methods as disclosed in this specification. In some cases, data engine 224 may include a special integrated circuit designed to carry out a method or a part thereof, and may also include software instructions operable to instruct a processor to perform the method. In some cases, data engine 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that data engine 224 may also include other hardware and software, including configuration files, registry entries, and interactive or user-mode software by way of non-limiting example.

In one example, data engine 224 includes executable instructions stored on a non-transitory medium operable to perform a method according to this specification. At an appropriate time, such as upon booting smart sensor 200 or upon a command from operating system 222 or an operator 120, processor 210 may retrieve a copy of the instructions from storage 250 and load it into memory 220. Processor 210 may then iteratively execute the instructions of data engine 224 to provide the desired method.

Data engine 224 may be configured to collect inputs from a sensor array 244, store data locally in storage 250 as necessary, and transmit inputs via network interface 260 so that the inputs can be aggregated by a server.

Peripheral interface 240 may be configured to interface with any auxiliary device that connects to smart sensor 200 but that is not necessarily a part of the core architecture of smart sensor 200. A peripheral may be operable to provide extended functionality to smart sensor 200, and may or may not be wholly dependent on smart sensor 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, sensor array 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU).

A sensor array 244 is also provided, which includes one or more sensors that provide inputs for smart sensor 200. In one particular example, this may be a mechanical input sensor, such as an acoustic or vibration sensor. In other examples, sensor array 244 may include, for example, an accelerometer (one, two, or three-axis), a microphone array, a vibration sensor, navigational aids, compasses, fluid level sensors, pressure sensors, synchros and angular sensors, temperature sensors, thermocouples, or any other sensor that provides a desired input.

ECU interface 246 may be provided to interface to an electronic control unit of an autonomous vehicle. In that case, smart sensor 200 may share inputs with ECU sensors, so that the inputs may be mutually beneficial.

Figure 3:
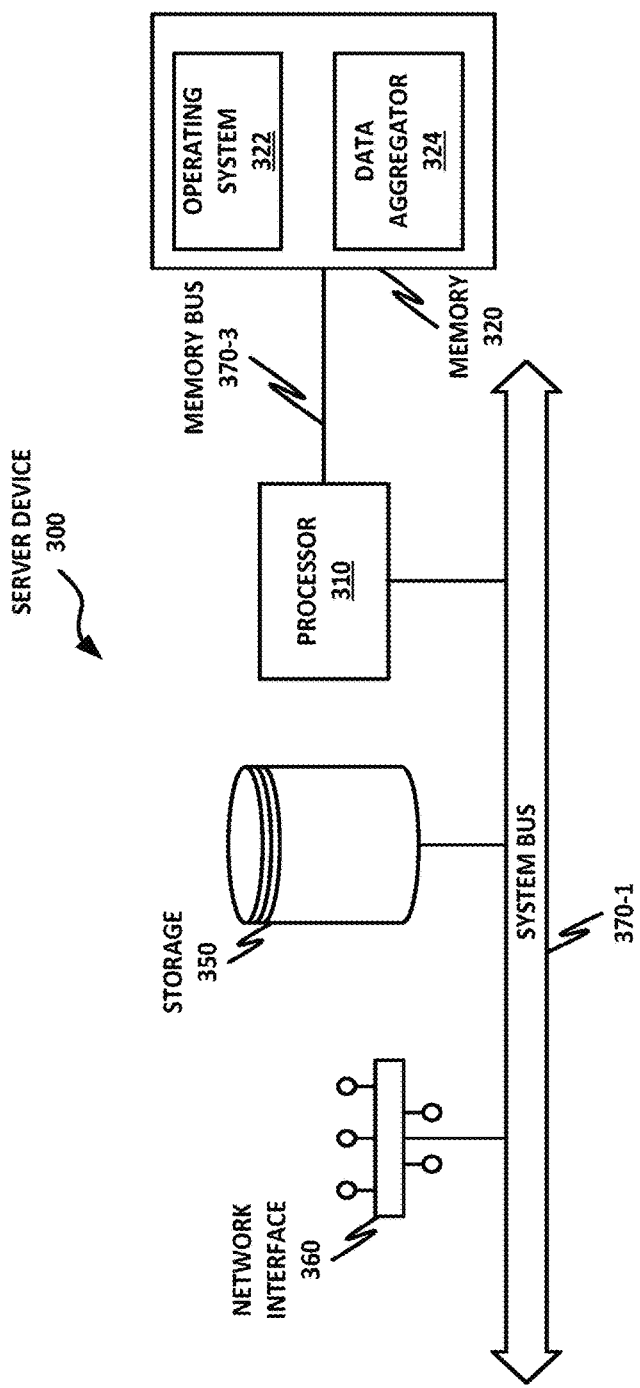
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein smart sensor 200 provides certain localized tasks, while server 300 provides certain other centralized tasks. In contemporary practice, server 300 is more likely than smart sensor 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a data aggregator 324. Other components of server 300 include a storage 350, and a network interface 360. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of data aggregator 324.

Network interface 360 may be provided to communicatively couple server 300 to a wired or wireless network, and may include one or more logic elements as described in FIG. 2.

Data aggregator 324 is an engine as described in FIG. 2 and, in one example, includes one or more logic elements operable to carry out computer-implemented methods as described in this specification. Software portions of data aggregator 324 may run as a daemon process.

Data aggregator 324 may include one or more non-transitory computer-readable mediums having stored thereon executable instructions operable to instruct a processor to provide data aggregator 324. At an appropriate time, such as upon booting server 300 or upon a command from operating system 322 or an operator 120 or security administrator 150, processor 310 may retrieve a copy of data aggregator 324 (or software portions thereof) from storage 350 and load it into memory 320. Processor 310 may then iteratively execute the instructions of data aggregator 324 to provide the desired method.

Data aggregator 324 may be configured to collect a plurality of inputs from a plurality of autonomous vehicles and aggregate the inputs into useful trends, actuarial data, and to identify discrepancies.

Figure 4:
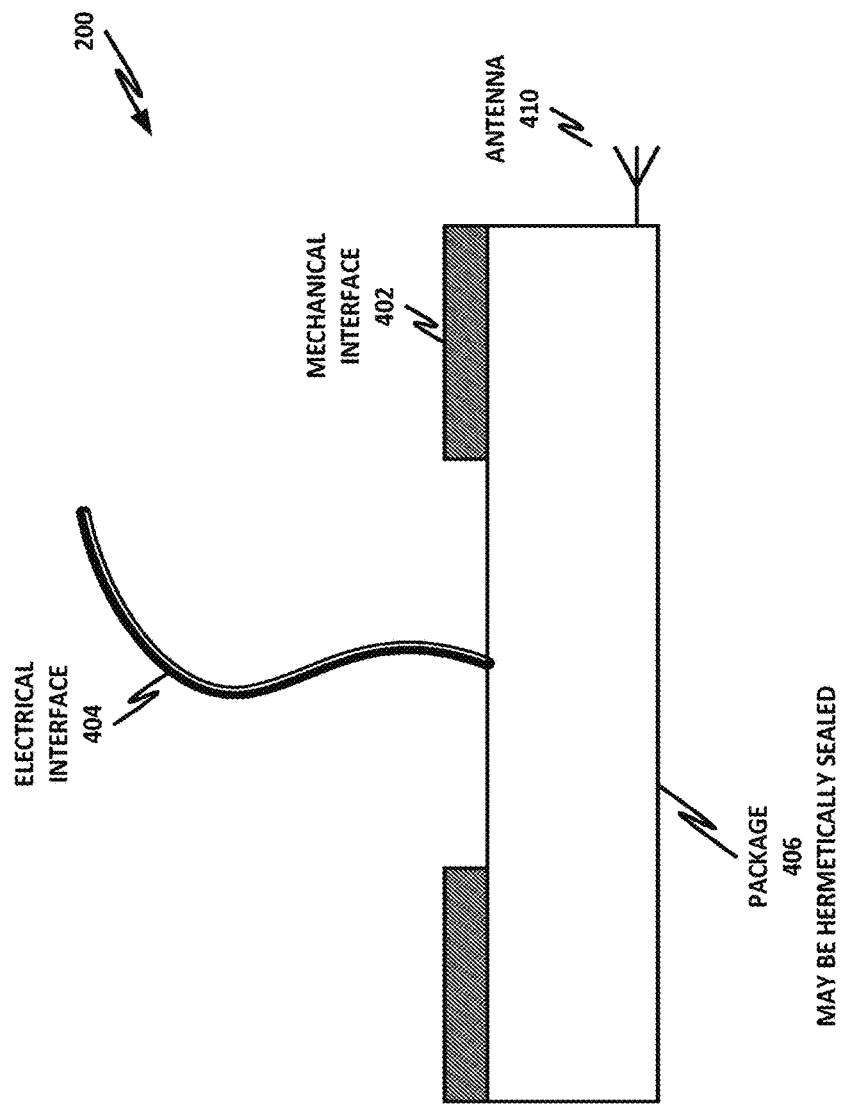
FIG. 4 is a side view of a smart sensor according to one or more examples of the present specification.

FIG. 4 is a side view of an example physical form factor and package of a smart sensor 200 according to one or more examples of the present specification.

In the example of FIG. 4, smart sensor 200 is encapsulated within a physical package 406. Note that package 406 in some examples may be hermetically sealed, so that smart sensor 200 is essentially a "brick" or "black box," such that its insides cannot be tampered with and its function cannot easily be modified. In some examples where package 406 is hermetically sealed, the internals of package 406 may be completely encased in a conformal coating of epoxy, resin, plastic, or other packaging material that makes it impractical to access smart sensor 200. This helps to ensure that smart sensor 200 cannot be easily tampered with and that it will not be appropriated for other purposes.

In this example, a mechanical interface 402 is also provided. Mechanical interface 402 enables smart sensor 200 to mechanically coupled to an autonomous vehicle. In the case where smart sensor 200 is a universal smart sensor configured to be deployed on any number of different vehicles, mechanical interface 402 may be a simple and universal coupling mechanism, such as a strong magnet, including a neodymium magnet, an adhesive pad, zip ties, Velcro securing straps, or some other mechanical interface. In other cases, a specific coupling harness may be provided with a specific receptor on the autonomous vehicle.

In this example, an antenna 410 may be provided with smart sensor 200. Antenna 410 may enable smart sensor 200 to wirelessly report data back to a data aggregator such as server device 300. In this example, antenna 410 is shown as an external antenna, but an internal antenna could also be used.

Also note that in other examples, where user privacy is at a premium over data collection, only a hard-wired network interface may be provided, such as a serial interface like RS-232, RS-485, USB, or Ethernet, a parallel port, or some other physical coupling may be provided. This ensures that the data can only be accessed when the user either provides the smart sensor 200 to a mechanic, or when the data aggregator is able to physically couple to smart sensor 200. This hinders the ability of a malicious actor to wirelessly aggregate large amounts of data from a large number of different devices without authorization.

In this example, an electrical interface 404 is also provided. Electrical interface 404 may, for example, enable smart sensor 200 to receive power from a power supply of the autonomous vehicle, or may enable smart sensor 200 to communicatively couple to an electronic control unit of the autonomous vehicle, or to share sensor data with the autonomous vehicle.

Figure 5:
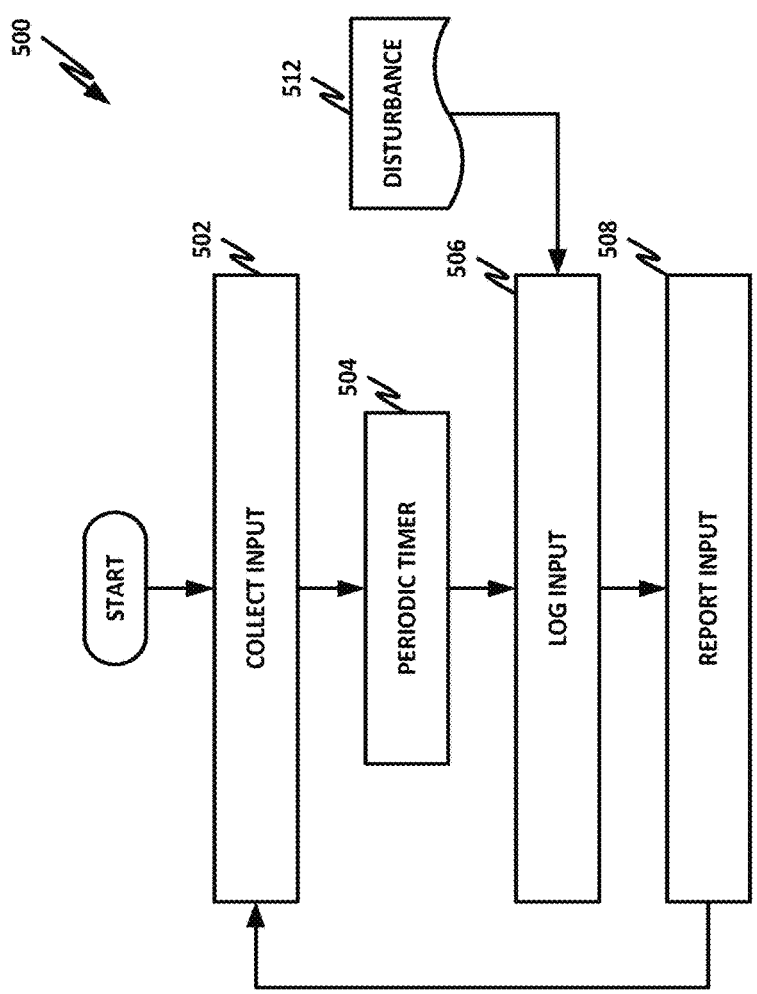
FIG. 5 is a flow chart of data collection by a smart sensor according to one or more examples of the present specification.

FIG. 5 is a flowchart of a data collection method 500 according to one or more examples of the present specification.

In block 502, smart sensor 200 operates its sensor array, which may include one or more sensors, to collect inputs. These inputs may be any type of suitable input, and in one particular example are acoustic and/or vibrational inputs that can be used to form an acoustic or vibrational profile for specific vehicle models. Collecting the input may include mechanically and/or electrically coupling to a transducer, and receiving data from the transducer, which may be digitized.

Periodic timer 504 may be a means to enable smart sensor 200 to periodically log the inputs. For example, inputs may be collected and logged on a fixed schedule, such as ever N seconds or minutes.

In block 506, smart sensor 200 logs the inputs. This may include, for example, storing the inputs to storage 250 or keeping them in a temporary buffer until they are reported.

In some examples, factors other than periodicity may drive logging or collection of input. For example, a disturbance 512 may occur. When disturbance 512 occurs, this may cause an instantaneous logging of the input, regardless of the state of periodic timer 504. A disturbance maybe any unusual event, such as an event that exceeds a threshold. For example, if the sensor array includes an acoustic sensor, then a disturbance may be an exceptionally loud event that exceeds an acoustic threshold. In the case where sensor the sensor array 244 includes a three-axis accelerometer to sense vibration, a disturbance 512 may include any unusual acceleration event. The presence of a disturbance may indicate an exception, unexpected, or unusual operating condition, and may thus be useful for building or modifying the input profile.

Either periodically, or responsive to disturbance, or on some other stimulus, in block 508 smart sensor 200 reports it collected inputs to a data aggregator. This can include periodically reporting via a wireless interface, or detecting that a hard-wired connection has been made, and responsive to detecting the hard-wired connection, beginning an automatic data dump.

In some examples, once data have been reported, they may be cleared from the local buffer or storage 250, or they may be retained according to the needs of the particular embodiment.

Figure 6:
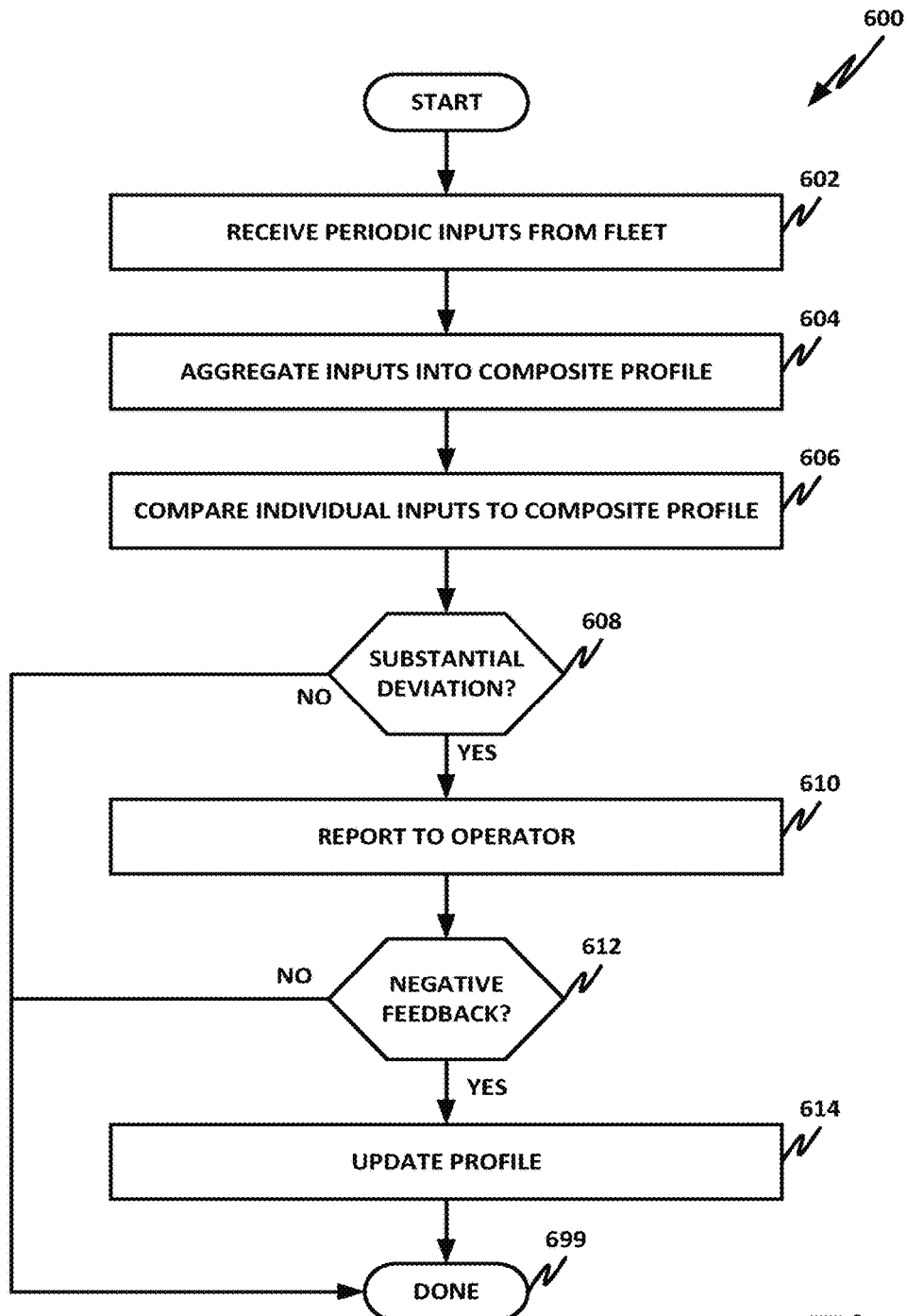
FIG. 6 is a flow chart of data aggregation by a server according to one or more examples of the present specification.

FIG. 6 is a flowchart of a method 600 of aggregating inputs according to one or more examples of the present specification. In connection with FIG. 6, the entity performing the method is referred to as a data aggregator, which may be data aggregator 324 of server device 300, or any other entity that can perform the data aggregator function.

In block 602, the data aggregator receives periodic inputs from a fleet of autonomous vehicles or other vehicles. Again, note that a fleet may include a homogeneous fleet operated by a single entity, or may include any group of vehicles, such as customers of a mechanic shop.

In block 604, the data aggregator aggregates inputs into a composite input profile. The composite input profile may be specific to the type of input (for example, an acoustic profile, a mechanical or vibrational profile, and electrical profile, or an input profile based on some other input). The composite profile may also be specific to a particular model. For example, if the data aggregator operates for an entity that owns a fleet of substantially homogeneous vehicles, then the composite profile may include data for a single make and model year. In the case of a mechanic gathering data about many different kinds of vehicles, the profile may be expanded, for example by including similar makes, models, or model years in the profile to help provide broader coverage (e.g., a Ford F-250 with a PowerStroke Diesel engine may have a similar axle vibrational profile to a Dodge Ram 2500 with a Hemi Diesel engine). In some cases, profiles may be at least partially extrapolated from other models (e.g., a Ford F-150 may have a similar acoustic profile to a Ford F-250 Super Duty, though the larger truck may be lower in pitch).

When the data aggregator receives periodic inputs from the fleet, these inputs are aggregated and incorporated into the composite input profile for that input and/or model of vehicle. Note that profiles may also be specific to systems or subsystems (e.g., engine, serpentine belt, axle, transmission, etc.).

In block 606, as part of its predictive function, the data aggregator compares certain individual inputs received to the composite profile. These may be inputs received from, for example, a single vehicle.

In decision block 608, the data aggregator determines whether there is a substantial deviation between the instantaneous input and the composite profile. If no substantial deviations are observed, then in block 699, the method is done.

Returning to block 608, if a substantial deviation is detected, then in block 610, the data aggregator reports the deviation to operator 120. This allows operator 120 to make decisions over time about how to respond and how to modify maintenance repair schedules for vehicles, or to otherwise use the inputs.

In decision block 612, the data aggregator determines whether native feedback was received from operator 120 in response to the report of substantial deviation. Negative feedback could mean that the operator 120 has examined the input and determined that it is not of concern, or that it should not be deemed a substantial deviation. If no negative feedback is received, then in block 699, the method is done.

If negative feedback is received in block 612, then in block 614, the data aggregator uses this negative feedback to update its profile, for example, by adjusting a statistical mean or standard deviation to more likely include the input. Over time, this allows the data aggregator to improve and strengthen the profile, and particularly to avoid false positives. For example, if a large number of events are received that include a similar event, and these events are reported to the operator and followed by negative feedback, the data aggregator may determine that these events are false positives and in the future should be ignored. More broadly, the incorporation of feedback, either positive or negative, may form a part of a machine learning algorithm that leads to improved prognosis and analysis over time.

In block 699, the method is done.

Figure 7:
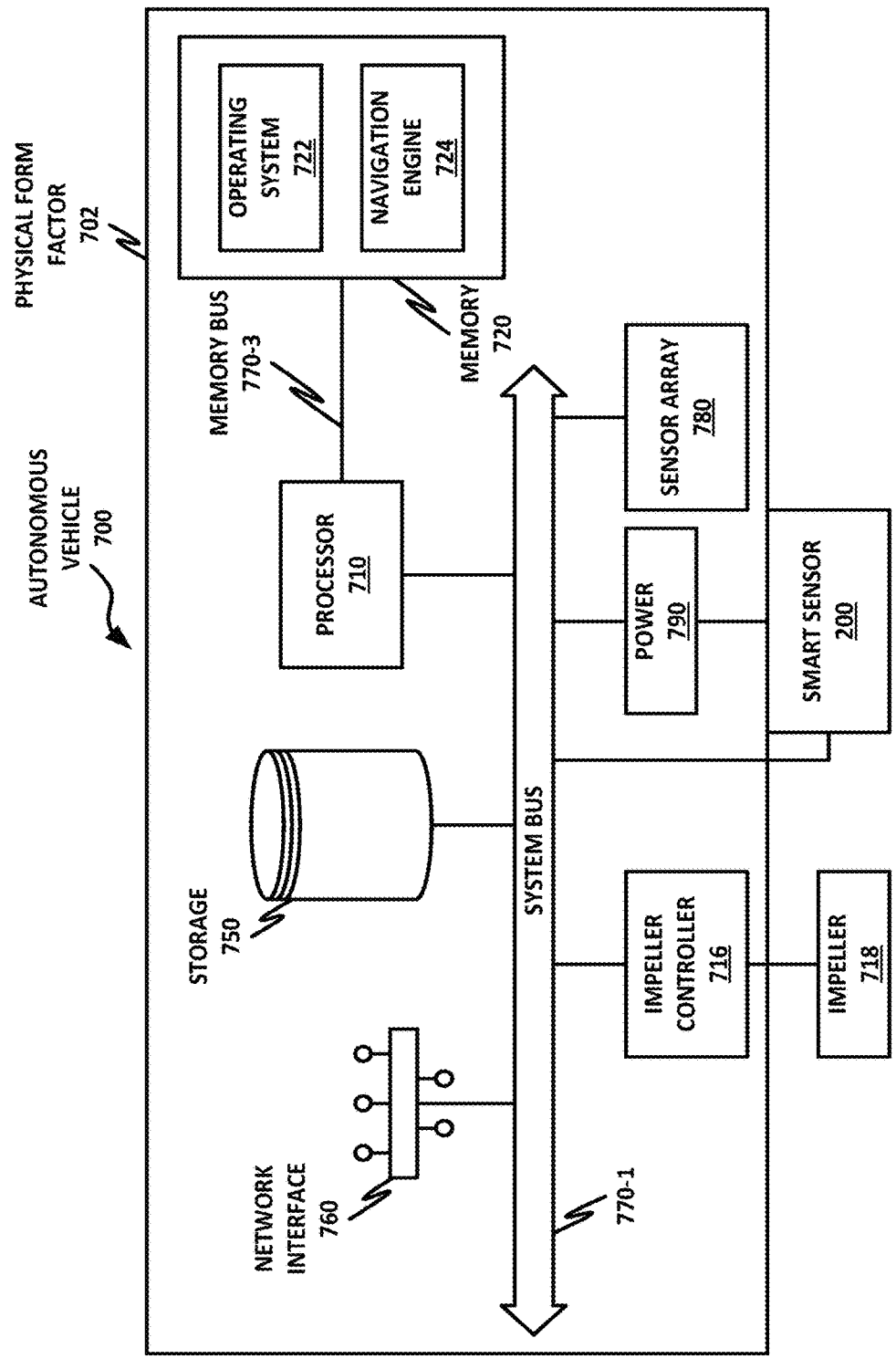
FIG. 7 is a block diagram of an autonomous vehicle according to one or more examples of the present specification.

FIG. 7 is a block diagram of an autonomous vehicle 700 according to one or more examples of the present specification. Autonomous vehicle 700 may have both a physical form factor 702, which provides structure, and an internal computational engine, which may be any suitable computing device as described in FIG. 2. In general, the definitions and examples of FIG. 2 may be considered as equally applicable to FIG. 4, unless specifically stated otherwise.

Autonomous vehicle 700 includes a processor 710 connected to a memory 720, having stored therein executable instructions for providing an operating system 722 and at least software portions of a navigation engine 724. Other components of autonomous vehicle 700 include a storage 750, and network interface 760. As described in FIG. 2, each logical block may be provided by one or more similar or dissimilar logic elements.

In an example, processor 710 is communicatively coupled to memory 720 via memory bus 770-3, which may be for example a direct memory access (DMA) bus. Processor 710 may be communicatively coupled to other devices via a system bus 770-1.

Processor 710 may be connected to memory 720 in a DMA configuration via DMA bus 770-3, or via any other suitable memory configuration. As discussed in FIG. 2, memory 720 may include one or more logic elements of any suitable type.

Storage 750 may be any species of memory 720, or may be a separate device, as described in connection with storage 250 of FIG. 2. Storage 750 may be, or may include therein, a database or databases or data stored in other configurations, and may include a stored copy of operational software such as operating system 722 and software portions of navigation engine 724.

Network interface 760 may be provided to communicatively couple autonomous vehicle 700 to a wired or wireless network, and may include one or more logic elements as described in FIG. 2. In the case of autonomous vehicle 700, network interface 760 is likely to include at least one wireless network interface, to allow autonomous vehicle 700 to communicate with remote devices while in transit. This is not, however, an absolute requirement.

Navigation engine 724 is an engine as described in FIG. 2 and, in one example, includes one or more logic elements operable to carry out computer-implemented methods as described in this specification. Software portions of navigation engine 724 may run as a daemon process.

Navigation engine 724 may receive inputs from a sensor array 780, which may include sensors that assist with navigation. This may include, by way of nonlimiting example, cameras (optionally with a dedicated computer vision system processing suite), proximity detectors, motion sensors, GPS navigational aids, infrared sensors, sound sensors, accelerometers, compasses, or microphones.

Navigation engine 724 may include one or more non-transitory computer-readable mediums having stored thereon executable instructions operable to instruct a processor to provide navigation engine 724. At an appropriate time, such as upon booting autonomous vehicle 700 or upon a command from operating system 722 or a user, processor 710 may retrieve a copy of navigation engine 724 (or software portions thereof) from storage 750 and load it into memory 720. Processor 710 may then iteratively execute the instructions of navigation engine 724 to provide the desired method.

Navigation engine 724 may be operable to direct autonomous vehicle 700 along an appropriate path, while safely and autonomously avoiding collisions or other disturbances.

Autonomous vehicle 700 includes an impeller 718, which may be any suitable impeller. Impeller controller 716 interfaces with the physical impeller 718. An impeller should be understood to include any electrical, mechanical, electromechanical, or microelectromechanical agent, including any suitable combination of hardware and software, that can provide a motive force to an autonomous vehicle. An impeller may include an engine (hydrocarbon, electric, hybrid, or any other suitable power source), drivetrain, and wheels, and electrically-powered propeller, chemical or nuclear engine or thruster, wheel and axle, tank tread, an electric motor, or any device that works on electrical or magnetic field principles, by way of nonlimiting example. Cars and trucks are discussed in this specification as an illustrative example, but are not limiting. In one example, a waterborne drone may include a water pump to provide thrust. In another example, a small magneto hydrodynamic impeller, which uses magnetic fields to propel water through a tube, may provide motion. In another example, a plurality of impellers may provide stable motion, such as in a "quad copter." In another example, a propeller may be used to impel vehicles through either air or water. In a vacuum, a rocket impeller may be used. Depending on the type of vehicle, the impeller may be very large or very small, and may be fueled by any suitable fuel source.

A power supply 790 provides power to autonomous vehicle 700. This may include, for example, a battery, a solar array, a fuel cell, an engine and alternator, a chemical power supply, a nuclear power source (e.g., fission, radioisotope thermal generator (RTG), or other), or any other suitable power source. Power supply 790 provides power to autonomous vehicle 700, and in some cases may also share power with smart sensor 200. Note that autonomous vehicle 700 can power smart sensor 200, smart sensor 200 can power autonomous vehicle 700, or both could be powered by one or more external sources.

Smart sensor 200 couples to autonomous vehicle 700, such as via physical form factor 702. The mechanical coupling could be, for example, via magnetic means, or coupling hardware.

In certain embodiments, smart sensor 200, autonomous vehicle 700, server device 300, and/or other client devices may provide a trusted execution environment (TEE) for secure computing and communication. This may provide the option for smart sensor 200 to provide signed, verified inputs that can be proved by, for example, direct anonymous attestation (DAA).

A memory enclave is a specially-designated portion of memory that cannot be entered into or exited from except via special instructions, such as Intel® SGX or similar. An enclave is provided as an example of a secure environment which, in conjunction with a secure processing engine, forms a trusted execution environment (TEE). A TEE is a combination of hardware, software, and/or memory allocation that provides the ability to securely execute instructions without interference from outside processes, in a verifiable way. Non-limiting examples of solutions that either are or that can provide a TEE include Intel® SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack.

In certain systems, computing devices equipped with the Intel® Software Guard Extension (SGX™) or equivalent instructions may be capable of providing an enclave. It should be noted however, that many other examples of TEEs are available.

In an example, the enclave provides a protected memory area that cannot be accessed or manipulated by ordinary computer instructions. One feature of an enclave is that once an enclave region of memory is defined, a program pointer cannot enter or exit the enclave without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from the enclave.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, smart sensors, client devices, or server devices may be provided, in whole or in part, in an SoC. The SoC may contain digital, analog, mixed-signal, and radio frequency functions, all of which may be provided on a single chip substrate. Other embodiments may include a multichip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processors 210, 310, 710, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250, 350, 750 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220, 230, 720 and storage 250, 350, 750 should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210, 310, 710 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing apparatus, comprising: a network interface configured to communicatively couple the apparatus to a sensor network comprising a plurality of smart sensors attached to a vehicle fleet; and one or more logic elements comprising a data aggregator engine to: receive an input from a smart sensor of the sensor network, the smart sensor associated with a vehicle of the fleet; and incorporate the input into an input profile associated with the vehicle.

There is also disclosed an example, wherein the vehicle is an autonomous vehicle.

There is also disclosed an example, wherein the data aggregator engine is further to make a failure prediction for the vehicle.

There is also disclosed an example, wherein making the failure prediction comprises determining that input is substantially deviant from the input profile.

There is also disclosed an example, wherein the data aggregator engine is further to create or modify a maintenance schedule for the vehicle based at least in part on the input profile.

There is also disclosed an example, wherein the data aggregator engine is further to create or modify an actuarial database for the vehicle based at least in part on the input profile.

There is also disclosed an example, wherein the data aggregator engine is further to eliminate false positive failure predictions over time.

There is also disclosed an example, wherein the data aggregator engine is further to recommend a design improvement for the vehicle based at least in part on the input profile.

There is also disclosed an example, wherein the data aggregator engine is further to extrapolate a failure prediction for the vehicle based on an input profile associated with a different vehicle model.

There is also disclosed an example, wherein the input is vibration input.

There is also disclosed an example, wherein the input is an acoustic input.

There is also disclosed an example, wherein the input is a joint acoustic/vibration input.

There is also disclosed an example of one or more tangible, non-transitory computer-readable storage mediums having stored thereon executable instructions to instruct a processor to: access a network interface configured to communicatively couple the apparatus to a sensor network comprising a plurality of smart sensors attached to a vehicle fleet; and provide a data aggregator engine to: receive an input from a smart sensor of the sensor network, the smart sensor associated with a vehicle of the fleet; and incorporate the input into an input profile associated with the vehicle.

There is also disclosed an example, wherein the vehicle is an autonomous vehicle.

There is also disclosed an example, wherein the data aggregator engine is further to make a failure prediction for the vehicle.

There is also disclosed an example, wherein making the failure prediction comprises determining that input is substantially deviant from the input profile.

There is also disclosed an example, wherein the data aggregator engine is further to create or modify a maintenance schedule for the vehicle based at least in part on the input profile.

There is also disclosed an example, wherein the data aggregator engine is further to create or modify an actuarial database for the vehicle based at least in part on the input profile.

There is also disclosed an example, wherein the data aggregator engine is further to eliminate false positive failure predictions over time.

There is also disclosed an example, wherein the data aggregator engine is further to recommend a design improvement for the vehicle based at least in part on the input profile.

There is also disclosed an example, wherein the data aggregator engine is further to extrapolate a failure prediction for the vehicle based on an input profile associated with a different vehicle model.

There is also disclosed an example, wherein the input is vibration input.

There is also disclosed an example, wherein the input is an acoustic input.

There is also disclosed an example, wherein the input is a joint acoustic/vibration input.

There is also disclosed an example of a computer-implemented method, comprising: accessing a network interface configured to communicatively couple the apparatus to a sensor network comprising a plurality of smart sensors attached to a vehicle fleet; and receiving an input from a smart sensor of the sensor network, the smart sensor associated with a vehicle of the fleet; and incorporating the input into an input profile associated with the vehicle.

There is also disclosed an example, wherein the vehicle is an autonomous vehicle.

There is also disclosed an example, further comprising making a failure prediction for the vehicle.

There is also disclosed an example, wherein making the failure prediction comprises determining that input is substantially deviant from the input profile.

There is also disclosed an example, further comprising creating or modifying a maintenance schedule for the vehicle based at least in part on the input profile.

There is also disclosed an example, further comprising creating or modifying an actuarial database for the vehicle based at least in part on the input profile.

There is also disclosed an example, further comprising eliminating false positive failure predictions over time.

There is also disclosed an example, further comprising recommending a design improvement for the vehicle based at least in part on the input profile.

There is also disclosed an example, further comprising extrapolating a failure prediction for the vehicle based on an input profile associated with a different vehicle model.

There is also disclosed an example, wherein the input is vibration input.

There is also disclosed an example, wherein the input is an acoustic input.

There is also disclosed an example, wherein the input is a joint acoustic/vibration input.

There is also disclosed an example of an apparatus comprising means for performing the method.

There is also disclosed an example, wherein the means for performing the method comprise a processor and a memory.

There is also disclosed an example, wherein the memory comprises machine-readable instructions, that when executed cause the apparatus to perform the method.

There is also disclosed an example, wherein the apparatus is a computing system.

There is also disclosed an example of at least one computer readable medium comprising instructions that, when executed, implement the method or realize the apparatus.

There is also disclosed an example of a smart sensor for monitoring a vehicle, comprising: a sensor array comprising a mechanical input sensor; a network interface; a processor; and one or more logic elements comprising a data engine to: collect an vibration input from the mechanical input sensor; and report the data from the mechanical input sensor to a data aggregator via the network interface.

There is also disclosed an example, wherein the mechanical input sensor is a vibration sensor.

There is also disclosed an example, wherein the mechanical input sensor is an acoustic transducer.

There is also disclosed an example, further comprising a mechanical coupler for coupling the smart sensor to the vehicle.

There is also disclosed an example, wherein the mechanical coupler comprises a magnet.

There is also disclosed an example, wherein the mechanical coupler comprises mounting hardware.

There is also disclosed an example, further comprising an interface for communicatively coupling to an electronic control unit of the vehicle.

There is also disclosed an example, wherein the network interface comprises a non-wireless connection.

What is claimed is:

1. A fleet health monitoring server, comprising:
   a network interface configured to communicatively couple the apparatus to a sensor network of mechanical or acoustic sensors attached to vehicles of a fleet of similar vehicles;
   a data store comprising a sensor input profile for vehicles of the fleet, the input profile comprising an aggregation of crowd-sourced sensor inputs into a normal behavior model of the mechanical or acoustic sensors of the sensor network; and
   one or more logic elements comprising a data aggregator engine to:
      receive an input from a mechanical or acoustic sensor of the sensor network; and
      incorporate the input into an input profile associated with the vehicles of the fleet.

2. The computing apparatus of claim 1, wherein the vehicles are autonomous vehicles.

3. The computing apparatus of claim 1, wherein the data aggregator engine is further to make a failure prediction for the vehicles.

4. The computing apparatus of claim 3, wherein making the failure prediction comprises determining that the input is substantially deviant from the input profile.

5. The computing apparatus of claim 1, wherein the data aggregator engine is further to create or modify a maintenance schedule for the vehicles based at least in part on the input profile.

6. The computing apparatus of claim 1, wherein the data aggregator engine is further to create or modify an actuarial database for the vehicles based at least in part on the input profile.

7. The computing apparatus of claim 1, wherein the data aggregator engine is further to eliminate false positive failure predictions over time.

8. The computing apparatus of claim 1, wherein the data aggregator engine is further to recommend a design improvement for the vehicles based at least in part on the input profile.

9. The computing apparatus of claim 1, wherein the data aggregator engine is further to extrapolate a failure prediction for the vehicles based on an input profile associated with a different vehicle model.

10. The computing apparatus of claim 1, wherein the input is vibration input.

11. The computing apparatus of claim 1, wherein the input is an acoustic input.

12. The computing apparatus of claim 1, wherein the input is a joint acoustic/vibration input.

13. One or more tangible, non-transitory computer-readable storage mediums having stored thereon executable instructions to instruct a processor to:
   access a network interface configured to communicatively couple the processor to a sensor network of mechanical or acoustic sensors attached to vehicles of a fleet of similar vehicles;
   provide a data store comprising a sensor input profile for vehicles of the fleet, the input profile comprising an aggregation of crowd-sourced sensor inputs into a normal behavior model of the mechanical or acoustic sensors of the sensor network; and
   provide a data aggregator engine to:
      receive an input from a mechanical or acoustic sensor of the sensor network; and
      incorporate the input into an input profile associated with the vehicles of the fleet.

14. The one or more tangible, non-transitory computer-readable storage mediums of claim 13, wherein the vehicles are autonomous vehicles.

15. The one or more tangible, non-transitory computer-readable storage mediums of claim 13, wherein the data aggregator engine is further to make a failure prediction for the vehicles.

16. The one or more tangible, non-transitory computer-readable storage mediums of claim 15, wherein making the failure prediction comprises determining that the input is substantially deviant from the input profile.

17. The one or more tangible, non-transitory computer-readable storage mediums of claim 13, wherein the data aggregator engine is further to create or modify a maintenance schedule for the vehicles based at least in part on the input profile.

18. The one or more tangible, non-transitory computer-readable storage mediums of claim 13, wherein the data aggregator engine is further to create or modify an actuarial database for the vehicles based at least in part on the input profile.

19. The one or more tangible, non-transitory computer-readable storage mediums of claim 13, wherein the data aggregator engine is further to eliminate false positive failure predictions over time.

20. The one or more tangible, non-transitory computer-readable storage mediums of claim 13, wherein the data aggregator engine is further to recommend a design improvement for the vehicles based at least in part on the input profile.

21. The one or more tangible, non-transitory computer-readable storage mediums of claim 13, wherein the data aggregator engine is further to extrapolate a failure prediction for the vehicles based on an input profile associated with a different vehicle model.

22. The one or more tangible, non-transitory computer-readable storage mediums of claim 13, wherein the input is vibration input.

23. The one or more tangible, non-transitory computer-readable storage mediums of claim 13, wherein the input is an acoustic input.

24. The one or more tangible, non-transitory computer-readable storage mediums of claim 13, wherein the input is a joint acoustic/vibration input.

25. A computer-implemented method, comprising:
   accessing a network interface configured to communicatively couple an apparatus to a sensor network of mechanical or acoustic sensors attached to vehicles of a fleet of similar vehicles;
   providing a data store comprising a sensor input profile for vehicles of the fleet, the input profile comprising an aggregation of crowd-sourced sensor inputs into a normal behavior model of the mechanical or acoustic sensors of the sensor network; and
   receiving an input from a mechanical or acoustic sensor of the sensor network; and
   incorporating the input into an input profile associated with the vehicles of the fleet.

* * * * *

UNITED STATES PATENT AND TRADEMARK OFFICE
CERTIFICATE OF CORRECTION

PATENT NO. : 10,482,689 B2
APPLICATION NO. : 15/572334
DATED : November 19, 2019
INVENTOR(S) : Eric Dwight McAfee et al.

Page 1 of 2

It is certified that error appears in the above-identified patent and that said Letters Patent is hereby corrected as shown below:

On the Title Page

Under "(72) Inventors", Line 3, delete "Tigard, OH (US):" and insert -- Tigard, OR (US). --, therefor.

In the Claims

In Column 22, Line 49, in Claim 1, delete "computing apparatus," and insert -- fleet health monitoring server; --, therefor.

In Column 22, Line 63, in Claim 2, delete "computing apparatus," and insert -- fleet health monitoring server; --, therefor.

In Column 22, Line 65, in Claim 3, delete "computing apparatus," and insert -- fleet health monitoring server; --, therefor.

In Column 23, Line 1, in Claim 4, delete "computing apparatus," and insert -- fleet health monitoring server; --, therefor.

In Column 23, Line 4, in Claim 5, delete "computing apparatus," and insert -- fleet health monitoring server; --, therefor.

In Column 23, Line 8, in Claim 6, delete "computing apparatus," and insert -- fleet health monitoring server; --, therefor.

In Column 23, Line 12, in Claim 7, delete "computing apparatus," and insert -- fleet health monitoring server; --, therefor.

In Column 23, Line 15, in Claim 8, delete "computing apparatus," and insert -- fleet health monitoring server; --, therefor.

Signed and Sealed this
Seventh Day of January, 2020

Andrei Iancu
*Director of the United States Patent and Trademark Office*

CERTIFICATE OF CORRECTION (continued)
U.S. Pat. No. 10,482,689 B2

In Column 23, Line 19, in Claim 9, delete "computing apparatus," and insert -- fleet health monitoring server; --, therefor.

In Column 23, Line 23, in Claim 10, delete "computing apparatus," and insert -- fleet health monitoring server; --, therefor.

In Column 23, Line 25, in Claim 11, delete "computing apparatus," and insert -- fleet health monitoring server; --, therefor.

In Column 23, Line 27, in Claim 12, delete "computing apparatus," and insert -- fleet health monitoring server; --, therefor.